United States Patent
Ye et al.

(10) Patent No.: US 11,477,291 B1
(45) Date of Patent: *Oct. 18, 2022

(54) SYSTEM AND METHOD FOR DYNAMICALLY CONFIGURING A HANDSHAKE PROTOCOL

(71) Applicant: PHILIPS NORTH AMERICA LLC, Cambridge, MA (US)

(72) Inventors: Qin Ye, Plano, TX (US); Robert W. Peterson, Plano, TX (US); Thomas T. Wheeler, Frisco, TX (US)

(73) Assignee: Philips North America LLC, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,190

(22) Filed: Aug. 31, 2021

Related U.S. Application Data

(63) Continuation of application No. 16/890,915, filed on Jun. 2, 2020, now Pat. No. 11,108,869, which is a continuation of application No. 16/127,736, filed on Sep. 11, 2018, now Pat. No. 10,674,327, which is a continuation of application No. 13/078,947, filed on Apr. 2, 2011, now Pat. No. 10,075,823.

(51) Int. Cl.
*H04L 67/141* (2022.01)
*H04W 4/20* (2018.01)

(52) U.S. Cl.
CPC ............ *H04L 67/141* (2013.01); *H04W 4/20* (2013.01)

(58) Field of Classification Search
CPC ... H04L 63/0428; H04L 63/166; H04L 63/08; H04L 63/0281; H04L 63/0823; H04L 63/101; H04L 63/168; H04L 63/0807; H04L 67/02; H04L 63/20; H04L 67/10; H04L 63/061; H04L 63/0869; H04L 41/0806; H04L 63/162; H04L 63/0435; H04L 9/14; H04L 2209/56; H04L 67/12; H04L 67/01; H04L 67/1097; H04L 1/0041; H04L 1/0002; H04L 69/16; H04L 67/306; H04L 1/0009; H04L 1/18; H04L 67/06; H04L 67/60; H04L 5/0064; H04L 63/0272; H04L 63/10; H04L 61/4511
See application file for complete search history.

(56) References Cited

U.S. PATENT DOCUMENTS

| | | |
|---|---|---|
| 6,449,733 B1 | 9/2002 | Bartlett et al. |
| 7,321,922 B2 | 1/2008 | Zheng et al. |
| 7,778,194 B1 | 8/2010 | Yung |
| 8,392,980 B1 | 3/2013 | Ahrens et al. |
| 2004/0098584 A1 | 5/2004 | Sherman et al. |

(Continued)

OTHER PUBLICATIONS

D. Balfanz et al.; "Secret Handshakes from Pairing-Based Key Agreements"; Proceedings of the 2003 IEEE Symposium on Security and Privacy; SP '03; 1081-601103.

*Primary Examiner* — Djenane M Bayard

(57) ABSTRACT

In order to enable a dynamic handshake procedure, a device may be configured with a list of handshake contributors. Contributors with connection handshake properties may be added to the contributor list. To perform handshake, the contributor list is processed to extract the connection handshake properties of each contributor to the handshake. Handlers for handling the connection handshake properties may also be dynamically added and invoked when a handshake is received.

20 Claims, 16 Drawing Sheets

(56) References Cited

U.S. PATENT DOCUMENTS

| | | | |
|---|---|---|---|
| 2005/0273850 A1* | 12/2005 | Freund | H04L 63/20 726/14 |
| 2008/0026740 A1* | 1/2008 | Netanel | H04L 63/0869 455/419 |
| 2008/0065880 A1* | 3/2008 | Martin | H04L 63/1441 713/181 |
| 2008/0133935 A1* | 6/2008 | Elovici | H04L 9/0894 713/193 |
| 2011/0087880 A1 | 4/2011 | Sorniotti et al. | |
| 2011/0296508 A1 | 12/2011 | Os et al. | |
| 2011/0319016 A1 | 12/2011 | Gormley et al. | |
| 2014/0122865 A1 | 5/2014 | Ovsiannikov | |

* cited by examiner

| VrmpMessagingProtocol |
|---|
| -SINGLETON : VrmpMessagingProtocol = new VrmpMessagingProtocol() <br> -clientHandshakeContributors : Map = new HashMap() <br> -serverHandShakeContributors : Map = new HashMap() <br> -connectionHandshakePropertiesHandlersList : ConnectionHandshakePropertiesHandlerList = new ConnectionHandshakePropertiesHandlerList() |
| <<create>>-VrmpMessagingProtocol() <br> +addClientHandshakeContributor(contributor : IConnetionHandshakeContributor) <br> +addConnectionHandshakePropertiesHandler(handler : IConnectionHandshakePropertiesHandler) <br> +addConnectionHandshakePropertiesHandler(handler : IConnectionHandshakePropertiesHandler, order : int) <br> +addServerHandshakeContributor(contributor: IConnectionHandshakeContributor) <br> +clientHandshake(connection : ITransportConnection, clientContext: ClientContext) : ConnectionProperties <br> +createEndpoint() : ProtocolEndpoint <br> +createEndpoint(aClientContext: AbstractClientContext, properties:ConnectionProperties, connection: ITransportConnection):ProtocolEndpoint <br> +createEndpoint(properties: ConnectionProperties, url:String) : IProtocolEndpoint <br> +createEndpoint(url: String) : IProtocolEndpoint <br> +getClientHandshakeContributor(contributorName: String): IConnectionHandshakeContributor <br> +getConnectionHandshakePropertiesHandlers(): IConnectionHandshakePropertiesHandler <br> +getServerHandshakeContributor(contributorName : String): IConnectionHandshakeContributor <br> +receiveHandshakeProperties(clientContext: ClientContext, connection:ITransportConnection, connectionProperties:ConnectionProperties) <br> +receiveHandshakeProperties(serverContext: ServerContext, connection:ITransportConnection, connectionProperties:ConnectionProperties) <br> +removeClientHandshakeContributor(contributor: IconnectionHandshakeContributor) <br> +removeClientHandshakeContributor(contributorName : String) <br> +removeConnectionHandshakePropertiesHandler(handler: IConnectionHandshakePropertiesHandler) <br> +removeServerHandshakeContributor(contributor: IConnectionHandshakeContributor) <br> +removeServerHandshakeContributor(contributorName :String) <br> +serverHandshake(connection:: ITransportConnection, serverContext: ServerContext): ConnectionProperties <br> -getContributorsArray(theContributors : Map) : IConnectionHandshakeContributor <br> -receiveHandshake(in:InputStream): ConnectionProperties <br> -sendHandshake(contributors: IConectionHandshakeContributor, output: DataOutputStream, getContributorProperties: GetContributorProperties) <br> +instance(): VrmpMessagingProtocol |

Figure 3

| ConnectionProperties |
|---|
| -theChangeListeners : List = new ArrayList/*<IConnectionPropertiesListener>*/() <br> -theProperties : Map = Collections.synchronizedMap(new hashMap/*<String, Properties>*/()) |
| +addContributorProperties(name: String, properties: Properties) <br> +addListener(newListener: IConnectionPropertiesListener) <br> +getContributorNames() : Set <br> +getProperties(contributorName :String) : Properties <br> +isEmpty() : boolean <br> +notifyListeners(providerName : String) <br> +removeListener(oldListener : IConnectionPropertiesListener) <br> +removeProperties(contributorName : String) : Properties |

Figure 8

| AbstractConnetionHandshakeContributor |
|---|
| -theName : String<br>-theProperties : Properties<br>-theClientPropertiesFlag : boolean |
| <<create>>#AbstarctConnectionHandshakeContributor(aName : String, isClient : boolean)<br><<create>>#AbstarctConnectionHandshakeContributor(aName : String, someProperties : Properties, isClient : boolean)<br>#addProperty(someProperties: Properties, aKeyRoot : String, aValue : String)<br>#getPropertyValues(someProperties: Properties, aKeyRoot : String) : List<br>+isClient() : boolean<br>+getName() : String<br>#getProperties() : Properties<br>#removePropertyIdentifiedBy(aKey : String)<br>#removePropertyByValue(aValue : String) |

Figure 11

| VrmpConnectionHandshakeContributor |
|---|
| +GUID : String = "guid" <br> +NAME : String = "vrmp" <br> +SERIALIZATION KEY ROOT : String = "serialization" |
| <<create>>-VrmpConnectionHandshakeContributor(aClientHandshaker : boolean) <br> +addSerialization(someProperties: Properties, serialization : String) <br> +createClientHandshakeContributor(): VrmpConnectionHandshakeContributor <br> +createServerHandshakeContributor():VrmpConnectionHandshakeContributor <br> +getGUID(someProperties : Properties) : Guid <br> +getSerialization(someProperties : Properties) : List <br> +setGUID(someProperties : Properties, guid : Guid) <br> +addSerialization(serializationId: String) <br> +getProperties(clientContext : ClientContext) : Properties <br> +getProperties(serverContext : ServerContext) : Properties <br> +removeSerialization(serializationId : String) |

Figure 12

SYSTEM AND METHOD FOR DYNAMICALLY CONFIGURING A HANDSHAKE PROTOCOL

FIELD OF THE INVENTION

This disclosure relates to client/server communications and in particular to handshake methods for initiating communications between a client and server.

BACKGROUND OF THE INVENTION

In terms of computer network communications, handshake usually means the process of one computer establishing a connection with another computer or device. The devices can communicate as peer-to-peer mode or as client-server mode. In either case, when computer1 attempts to establish a connection with computer2, computer2 must decide to accept (or deny or ignore) the connection. The handshake is often the steps of verifying the connection, the speed, and/or the authorization of the computer trying to connect to it.

Handshake protocols are a series of technical rules that both parties agree upon. For example, when a connection is initiated by device1, device1 may send a HELLO packet to a specific port on device2. Device2 then, if accepting the connection, sends an ACK packet back to device1. The Handshake protocol is responsible for the negotiation, the initial key exchange, and/or authentication of the two entities.

In order for one device to communicate with another device, both sides must follow the same rules otherwise the communication is doomed to fail. But the problem is the device world is evolving constantly while the handshake protocols, once deployed, are typically static. Protocols that work perfectly today may need modification next month, next week or even the next day because special needs arise. New requirements may imply the needs to change the existing handshake protocol. Once the protocol has been rewritten, there may then be requirements for testing, bug fixing, etc before ultimately deploying the new protocol to existing devices in the field.

What is required is a handshake method that provides dynamic handshake capabilities.

SUMMARY OF THE INVENTION

In order to enable a dynamic handshake procedure, a device may be configured with a list of handshake contributors. Contributors with connection handshake properties may be added to the contributor list. To perform handshake, the contributor list is processed to extract the connection handshake properties of each contributor to the handshake. Handlers for handling the connection handshake properties may also be dynamically added and invoked when a handshake is received.

In one aspect of the disclosure, there is provided a method for configuring a handshake for a first device. At least one contributor is generated comprising one or more connection properties. The contributor is added to a contributor list in the first device. The contributor list is used to perform a handshake to a second device.

In one aspect of the disclosure, there is provided a method of performing a handshake from a device. A contributor list is generated comprising one or more contributors, each contributor providing one or more connection handshake properties. A handshake is generated from a contributor list comprising one or more contributors, each contributor providing one or more connection handshake properties. Updates to the contributor list can be installed so that further handshakes can be performed using the updated contributor list.

In one aspect of the disclosure, there is provided a computer-readable medium comprising computer-executable instructions for execution by at least one processor of a first device, that, when executed, cause the at least one processor to generate a contributor comprising one or more connection handshake properties and add the contributor to a contributor list.

BRIEF DESCRIPTION OF THE DRAWINGS

Reference will now be made, by way of example only, to specific embodiments and to the accompanying drawings in which:

FIG. 3 depicts an embodiment of a class diagram of a messaging protocol;

FIG. 8 depicts a class diagram for the ConnectionProperties element, which is the result of server and client handshake;

FIG. 11 depicts an embodiment of an AbstractConnectionHandshakeContributor class which may form the base class for all ConnectionHandshakeContributor;

FIG. 12 depicts an embodiment of a proprietary ConnectionHandshakeContributor class.

DETAILED DESCRIPTION OF THE INVENTION

As is stated above, in order for two computers/devices to communicate with each other, they need to follow the same protocol. If one communicates out of sync with the other, the communication will fail.

In the context of communication protocols a Handshake refers to a negotiation between the two ends of a communication channel, most frequently during a change in the channel's state. As will be described below, the handshake may be extended by including data provided by a collection of handshake contributors. For example, a protocolConnectionHandshakeContributor can be added which specifies the name of the contributor(s) and connectionProperties to be exchanged during the handshake time. The specific data exchanged during Handshake time, e.g. the handshake properties, is usually application specific. However, as long as both sides follow the same rules and interpret the message in the same way, there should be no problem communicating with each other.

Using the concept of a "contributor" assists in changing the handshake requirements if required. For instance, at one time, an application may have its own connection handshake mechanism. Applying the contributor concept, there may be a ProtocolConnectionContributor, which holds the properties for the particular handshake mechanism between two devices. There may also be a ProtocolConnectionHandshakePropertiesHandler to handle the result of the handshake. At some later time, there may be a need to modify the application to provide authentication using LDAP. By adopting the concept of "contributor", the additional handshake requirement for LDAP can be grouped into LDAPHandshakeContributor and the handling for the LDAP handshake into can be grouped into LDAPHandshakePropertiesHandler. The LDAP contributor and handler belong to a separate module with its own purpose. The modifications can be performed in an effective, clean, and easy to understand manner and, importantly, without interfering with the existing ProtocolConnectionHandshake.

Each handshake contributor provides both a unique name and a collection of name/value pairs (properties). The contributors' names and properties are passed over a connection using a handshake packet. The list of the handshake contributors that apply to a specific connection can vary depending on the requirements of the communications protocol, the host platform, and the application, amongst other factors. A handshake packet will contain values provided by zero or more handshake contributors. This innovation provides an easy to implement, easy to use mechanism for extending a protocol's handshake without a change in the underlying protocol.

Figure 1:
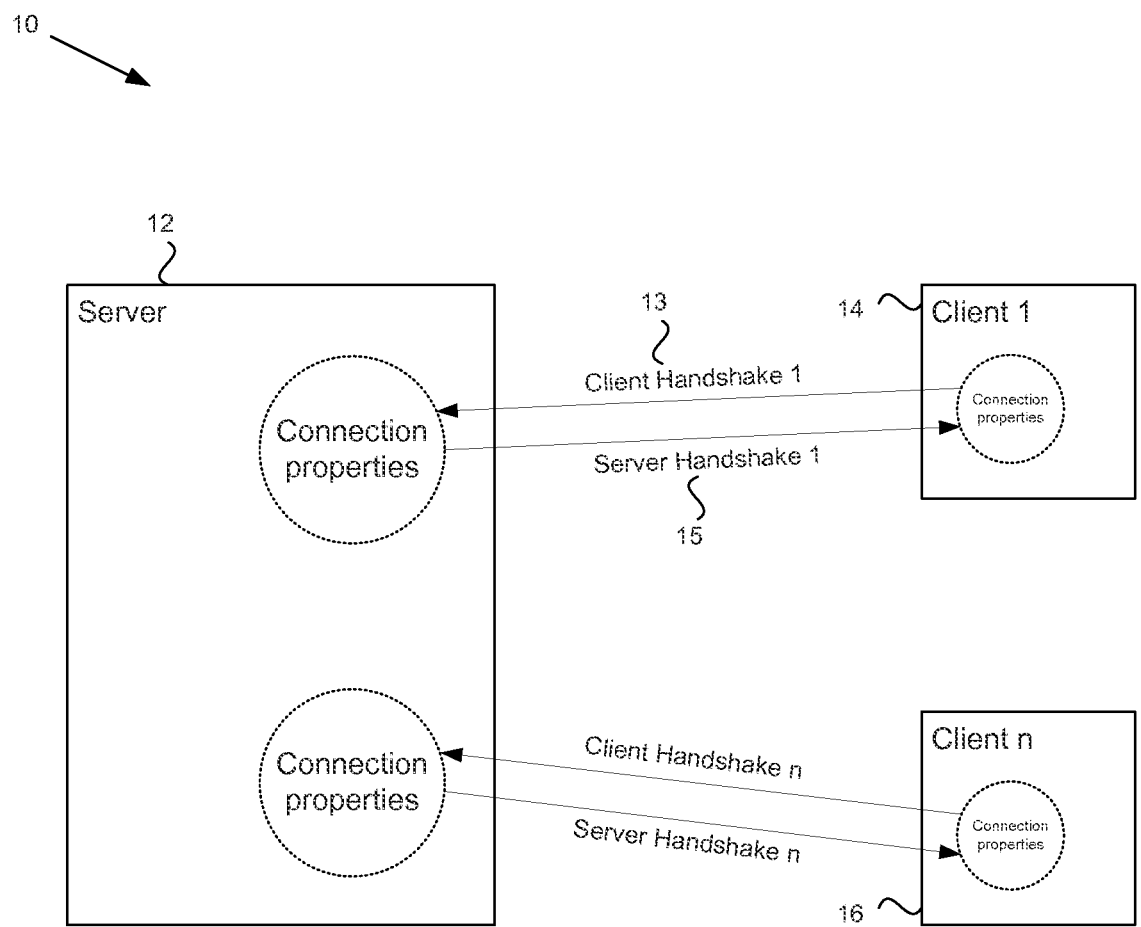
FIG. 1 depicts a client/server system.

In FIG. 1, there is shown a system 10 on which the handshake methods to be described may be implemented. The system 10 includes a server 12 and one or more clients, e.g. client_1 14 to client_n 16. Throughout the description of embodiments to follow, specific reference may be made to the present assignee's own proprietary system, known as "Voyager" ™, further details of which are provide in the Applicant's co-pending patent application Ser. No. 13/078, 948 filed on Apr. 2, 2011, now U.S. Pat. No. 9,244,741, issued on Jan. 26, 2016 and patent application Ser. No. 13/078,950 filed on Apr. 2, 2011, now U.S. Pat. No. 9,002, 994, issued on Apr. 7, 2016, the entire contents of which are specifically incorporated herein by reference. However, any reference to the Voyager™ system is provided for illustrative purposes only and intended to be non-limiting.

Figure 2:
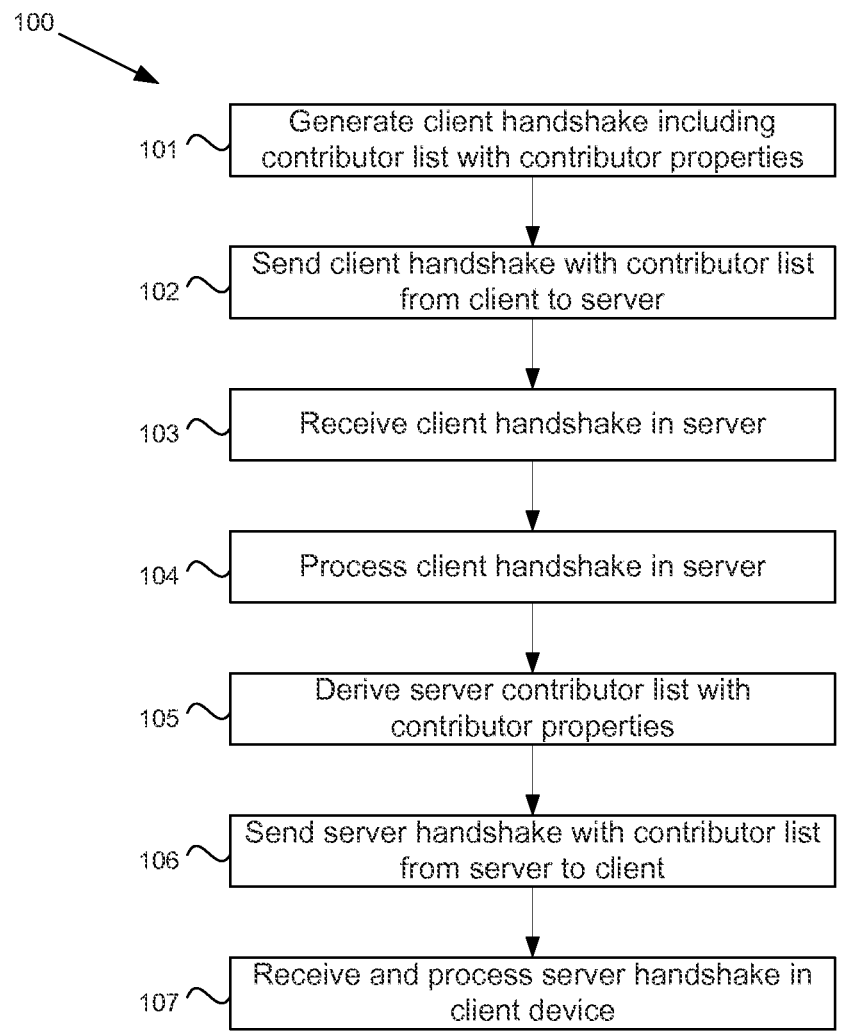
FIG. 2 depicts a process for performing handshake on the client/server system of FIG. 1.

In FIG. 2, there is shown a method for providing a handshake between a client and server. While the client/server system is the example depicted, the handshake process may be performed more broadly between generic devices, such as device1 and device2, which may be clients and servers, peer-to-peer devices, etc. At step 101, the client device e.g. client_1 14, or more generically, the device_1 initiating communications, generates a client handshake that includes a contributor list with contributor properties. The contributor list may be derived from all of the contributors that the application is configured with at the time of performing the handshake, including contributors for which the application was initialized as well as contributors added subsequently. Processes for updating and/or extending the list contributors will be provided in more detail below. With reference to the example discussed above, an application may be configured initially with a ProtocolConnectionContributor. The application may also include an LDAPHandshakeContributor, which may be provided as part of the initial configuration of the application or may be provided as an extension of the original configuration at a later time. In the present Assignee's Voyager™ example, in the protocol initialization stage, VrmpMessagProtocol gets initialized. This implies that the VrmpMessagProtocol's constructor is called. In the VrmpMessagProtocol's constructor, the addClientHandshakeContributor and addServerHandshakeContributor are called to add the contributor with the contributor name "vrmp". An embodiment of the class digram of VrmpMessagingProtocol is depicted in FIG. 3.

Each contributor may specify one or more connection properties or handshake properties including, without limitation, a GUID (Globally Unique Identifier), serialization method (java, Hessian), etc. The client device 14 then sends a client handshake (e.g. ClientHandshake_1 13 to the server 12 (generically, device_2) (step 102). ClientHandshake_1 13 includes the list of contributors and their respective properties. The server 12 receives the client handshake 13 (step 103) and processes the contributor list (step 104). The server 12 then generates its own contributor list (step 105) and provides a server handshake (e.g. ServerHandshake_1 15) to the client device 14 (step 106). The client device 14 receives the server handshake 15 and processes the server handshake in the client device 14 (step 107). The processing of the handshake by the client and server devices will typically be application specific. Examples of how the handshake is processed will be provided below.

Client_n 16, in initiating its own communications with the server 12, will send its own contributor list with its own connection properties. In this way, the server is able to handshake with multiple clients without using any single fixed protocol. Updates to handshake properties do not need to be made universally, since the server is able to adapt to any handshake properties available to a particular client device.

Figure 4:
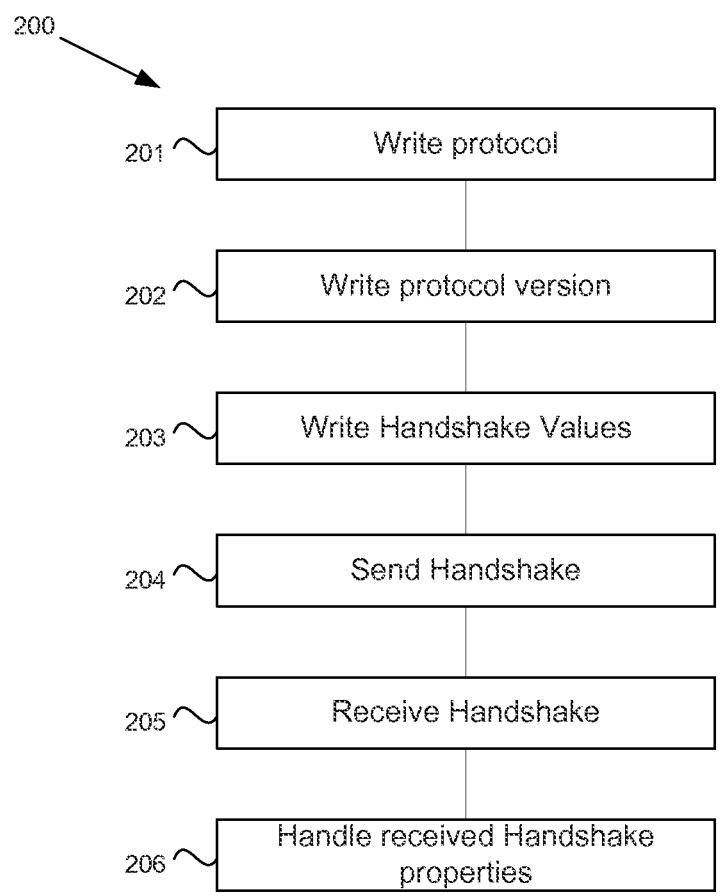
FIG. 4 depicts a client side process of performing a handshake.

An embodiment of the client side handshake process is shown in more detail in the flowchart 200 of FIG. 4. At step 201, the client device writes the protocol, then writes the protocol version (step 202) to a handshake packet. The client then writes the handshake values 203 before sending the handshake 204 to the server and receiving the server handshake in response 205. Writing the protocol and the protocol version may be optional steps. In the Voyager example, the protocol head can be changed over time. Therefore, the specific protocol head may be associated with a version number so that when client and server communicate they can confirm they are using the same protocol with the correct protocol version.

Figure 5:
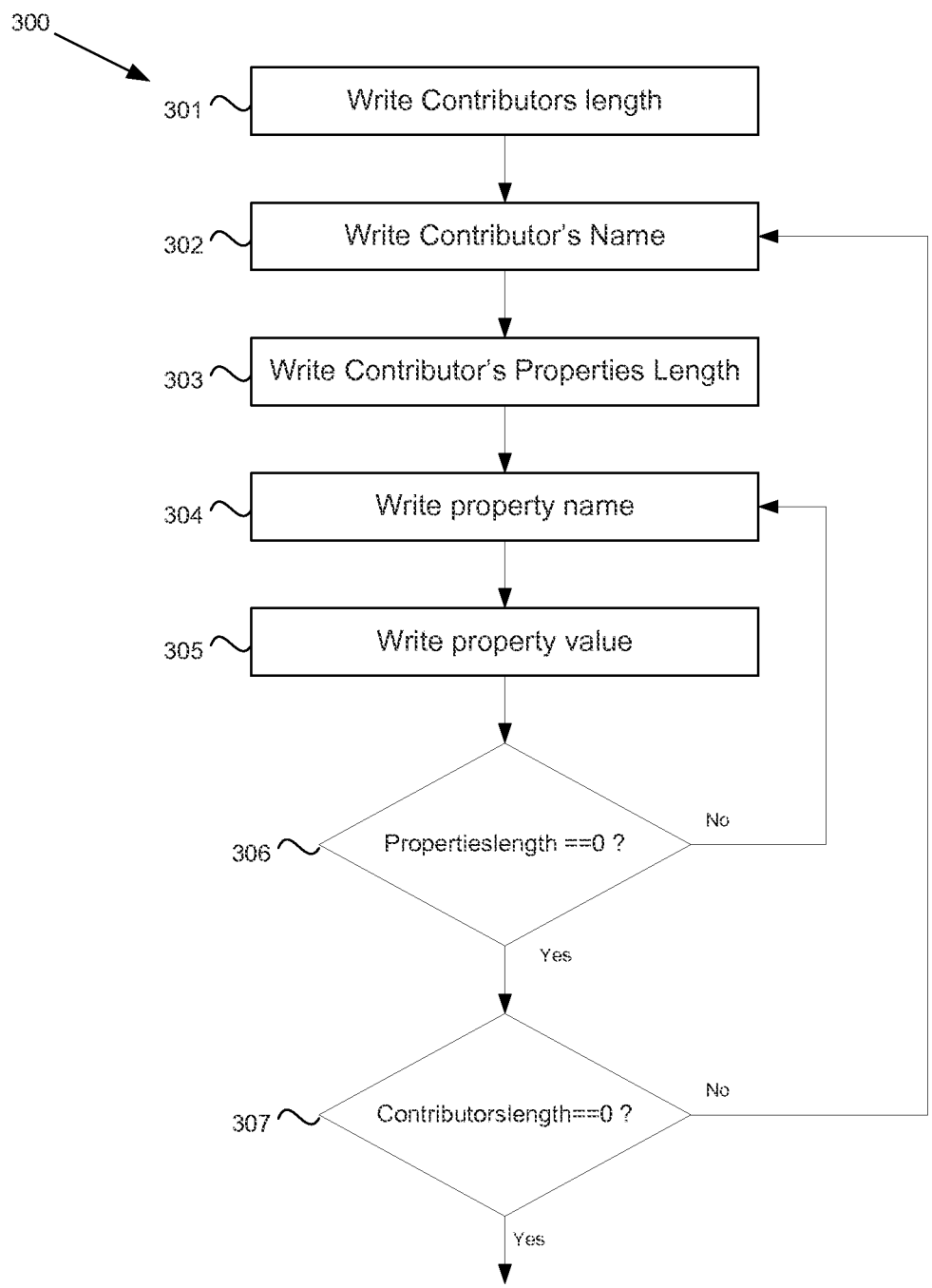
FIG. 5 depicts common process steps of sending a handshake for both server and client.

An embodiment of the process for sending the handshake (step 204 of FIG. 4) is elaborated in the flowchart of FIG. 5. At step 301, the device (either client or server) writes the number of contributors by referencing the contributor list initialized from the messaging protocol initialization stage (described in greater detail below). Writing the total length of the Contributors at one end aids the receiving device in processing the handshake. If the length is zero, i.e. there are no contributors then the process is done. Otherwise, if there exists at least one contributor the device iterates through the contributors to write the contributor's name (step 302) and write the contributor's properties length (step 303). A check may be done to determine if the PropertiesLength is zero. If it is, then the process is done for this contributor. For non-zero properties length, the process iterates through the properties for this contributor and writes the properties Name (step 304) and writes Properties value (step 305) until all properties are written, i.e. PropertiesLength is zero (determination 306). The process then iterates for the next Contributor until the ContributorsLength is zero (determination 307)

In the Voyager™ example, the proprietary VrmpConnectionHandshakeContributor's client side properties are constructed by first setting the GUID from the clientContext for the properties and then add the serialization method for the properties. Finally it returns the properties as the properties for the contributor. On the other hand, server side properties are constructed by setting the GUID from the serverContext for the properties and then added serialization method for the properties. Finally it returns the properties as the properties for the contributor. The ConnectionHandshakeContributor hold the properties for a handshake between the client and server. It uses "contributor" i.e. the connectionHandshakeContributor class to provide the actual properties. Properties may include, without limitation, GUID, encryption info (public key), serialization types supported and environment properties etc. For instance, the properties can be read from a configuration file that has the name/value pair for IP, Port etc.

In a more general example, the application would configure the contributor, set the properties and associate these properties with the contributor before the process of writing the handshake packet as described in FIG. 5. There may be two instances of this class: one is for client-side properties and the other is for server-side properties. When properties are to be sent over the wire, the protocol will ask for either client or server properties.

Figure 6:
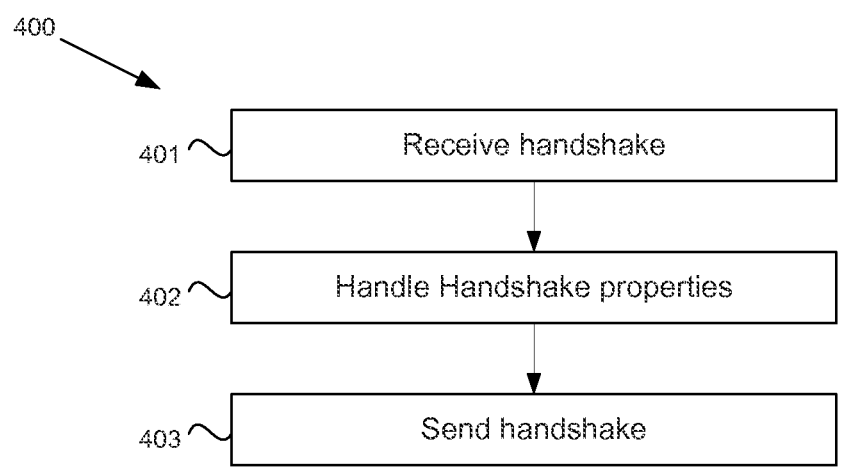
FIG. 6 depicts a server side process for performing a handshake.

An embodiment of a handshake process undertaken at the server side is depicted in the flowchart 400 of FIG. 6. At step 401, the server receives the handshake packet from the client. The server then handles the handshake properties (step 402) before responding with a server handshake packet (step 403).

Figure 7:
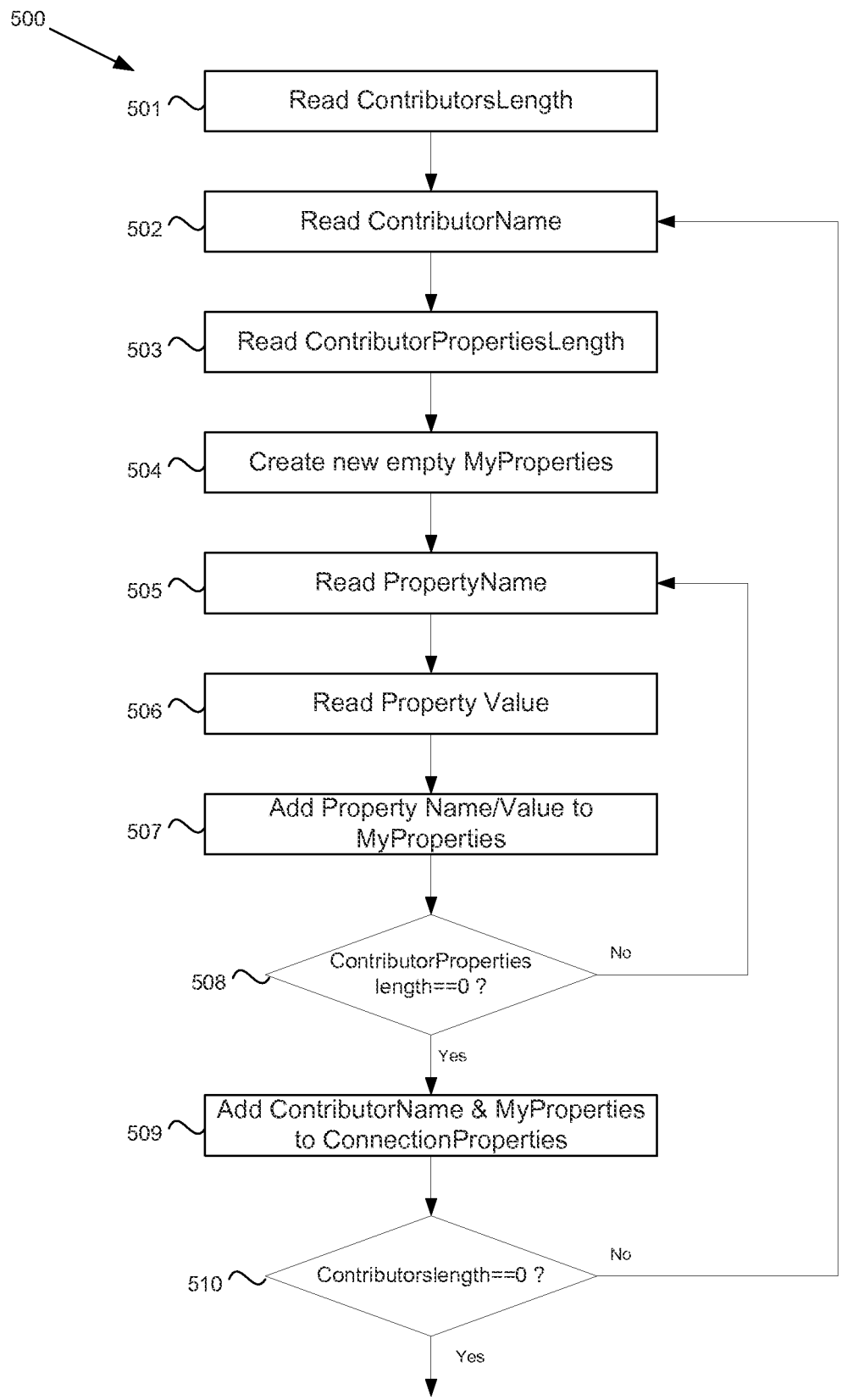
FIG. 7 depicts common process steps of receiving a handshake for both server and client.

An embodiment of a process for handling the handshake (both the client and server) is depicted in the flowchart 500 of FIG. 7. The process 500 is iterated for each contributor written into the handshake packet by the client or server. At step 501, the receiving device reads the ContributorsLength parameter of the handshake to learn the number of Contributors that are to be processed. Assuming the handshake includes at least one contributor, the device reads the ContributorName (step 502) and then reads the ContributorPropertiesLength (step 503). A new empty "myproperties" name/value is created (step 504) the PropertyName and PropertyValue pair are read (steps 505, 506) and added to the MyProperties entity for this contributor (step 507). If there are further property name/value pairs for the current contributor, the process can iterate by returning to step 505 to read the next property name/value pair. Once all properties for the contributor have been read, as determined at step 508, the ContributorName and the associated MyProperties is added to the ConnectionProperties, which is the result of the handshake. The process can then return to step 502 and be repeated for any remaining contributors that were provided in the handshake packet. An example of the ConnectionProperties class is depicted in FIG. 8.

When the client receives a handshake packet from the server, the client follows a similar process to the server process depicted in FIG. 7.

Figure 9:
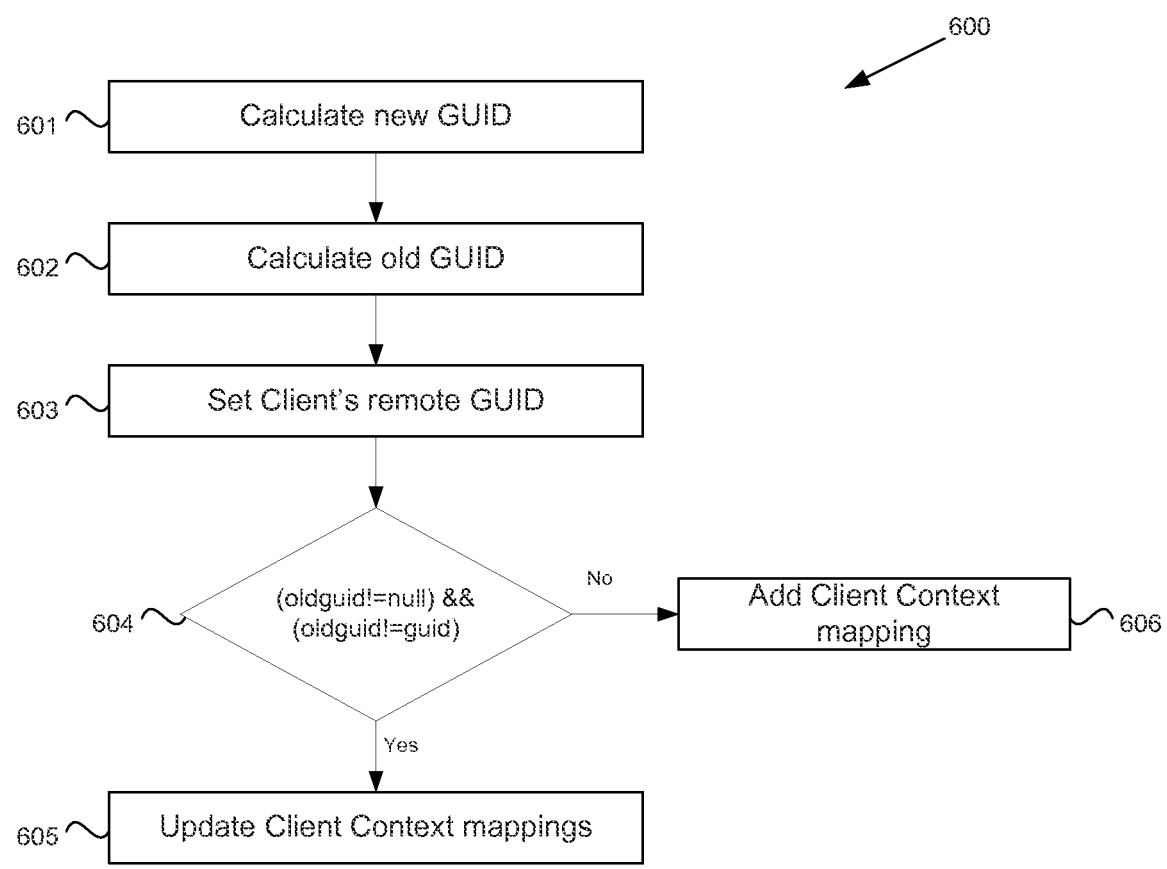
FIG. 9 depicts a client side process for updating client context mappings based on properties received in a handshake packet.

Once the handshake packets have been exchanged, the client and server can each proceed to establish a connection based on the exchanged properties. How the connection is established may be context and/or application specific. In the Voyager example, the client side process for handling the handshake properties may be as depicted in the flowchart 600 of FIG. 9. At step 601, the client device calculates a new GUID based on the connectionProperties it received. Here the GUID represents a remote voyager identity. The client device calculates the old GUID based on its clientContext's remote voyager method call (step 602). The client then sets its remote voyager guid based on the new guid (step 603). If the condition in determination 604 is met, then the existing Client Context mappings are updated (step 605). Update may be achieved by using the new GUID (which is derived from the ConnectionProperties that is received from the other side) and old GUID. The update process will remove the old GUID for a given clientcontext name and add the new GUID to the clientContext. Otherwise, a new Client Context Mapping is created (step 606).

Figure 10:
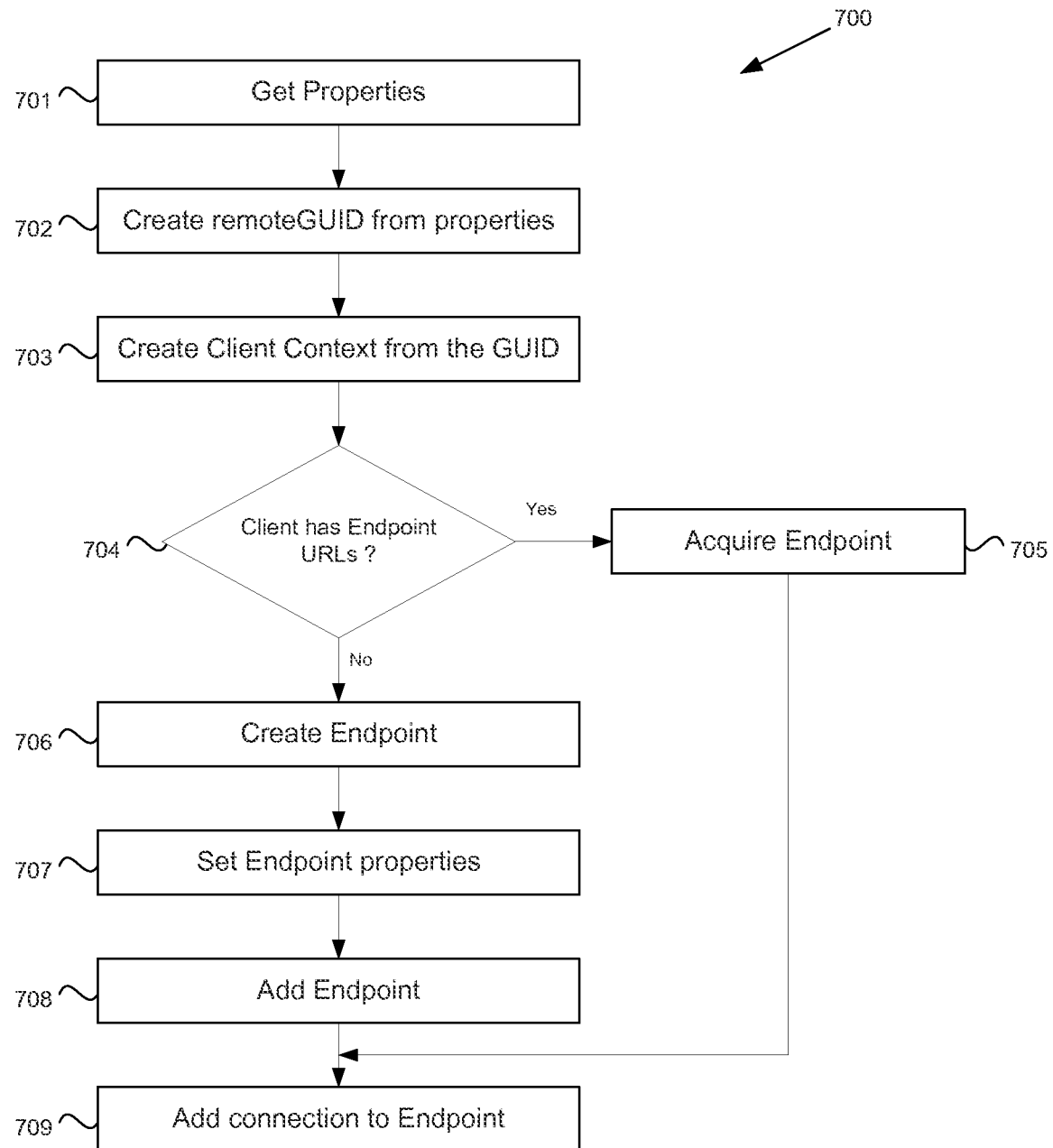
FIG. 10 depicts a server side process for establishing a connection based on properties received in a handshake packet.

A server side process for establishing the connection is depicted in the flowchart 700 of FIG. 10. At step 701, the server gets the properties based on the connectionProperties received in the handshake and creates a remoteGUID from the properties (step 702). In the Voyager example, VrmpConnectionHandshakeContributor.getGuid(props) is called to create the remote guid. The server then creates a Client Context from the GUID (step 703). If the client has Endpoint URLs (determination 704) then the server acquires the endpoint (step 705). Otherwise, the server creates an Endpoint (step 706) and sets the Endpoint properties (step 707). The Endpoint has ConnectionProperties as a member of its class. The endpoint is then added to the clientContext (step 708). Finally the connection is added to the endpoint (step 709).

The creation of the ClientContext and ServerContext is applicable to the Voyager platform described in the patent applications referenced above. Other techniques for establishing a connection based on the exchanged handshake properties will be apparent to a person skilled in the art.

The handshake protocol may be based on several classes and methods as listed below:

AbstractConnectionHandshakeContributor; its class diagram is in FIG. 11.

ClientHandshakeContributors is a (HashMap). It is an attribute for MessagingProtocol class.

ServerHandshakeContributors is also a (HashMap). It is an attribute for MessagingProtocol class)

VrmpConnectionHandshakeContributor; its class diagram is in FIG. 12.

AddClientHandshakeContributor is a method in MessagingProtocol.

AddServerHandshakeContributor is a method in MessagingProtocol.

Figure 13:
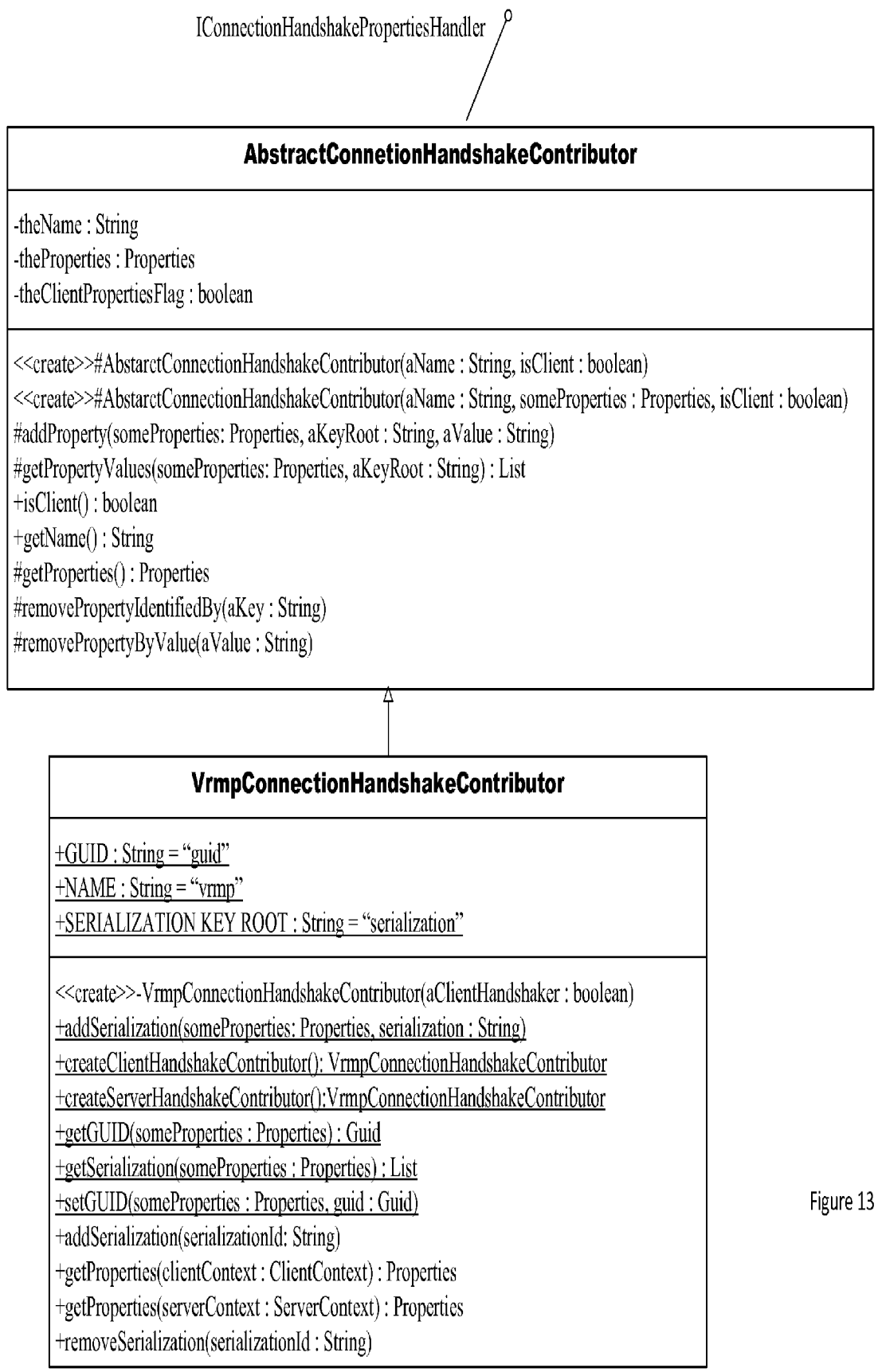
FIG. 13 depicts a relationship among IconnectionHandshakeContributor, AbstractConnectionHandshakeContributor and VrmpConnectionHandshakeContributor.

AbstractConnectionHandshakeContributor is the base class for all HandshakeContributor. It implements IconnectionHandshakeContributor. For example, an application can have a ProtocolConnectionHandshakeContributor and LDAPHandshkeContributor etc. FIG. 13 demonstrates the relationship among IconnectionHandshakeContributor, AbstractConnectionHandshakeContributor and VrmpConnectionHandshakeContributor. In the AbstractConnectionHandshakeContributor, it has the ClientPropertiesFlag, which distinguishes if the property is a client property or a server property. It also has the contributor's name and the properties.

When the protocol is first initialized in a device, before any connection is made, it calls addClientHandshakeContributor and addServerHandshakeContributor. It puts a contributor's name and the contributor (name/value pair) into the prospective handshakeContributors (eg the Hashtable of clientHandshakeContributors and serverHandshakeContributors).

The class ConnectionProperties (FIG. 8) has an array list of listeners, and a Hashtable of connectionProperties. It has members such as addContributorProperties, which add contributor's name and properties to the hashtable of the connectionProperties; getContributorNames returns an array list of contributors name; and getProperties returns properties for a particular contributor name.

An advantage of the presently described handshake methods includes that the handshake is dynamic and updateable, For example, the application may add a contributor to the server and client with contributor's name "qualityOfService". In this way the client and server can negotiate things such as bit rate, delay, jitter etc.

Figure 14:
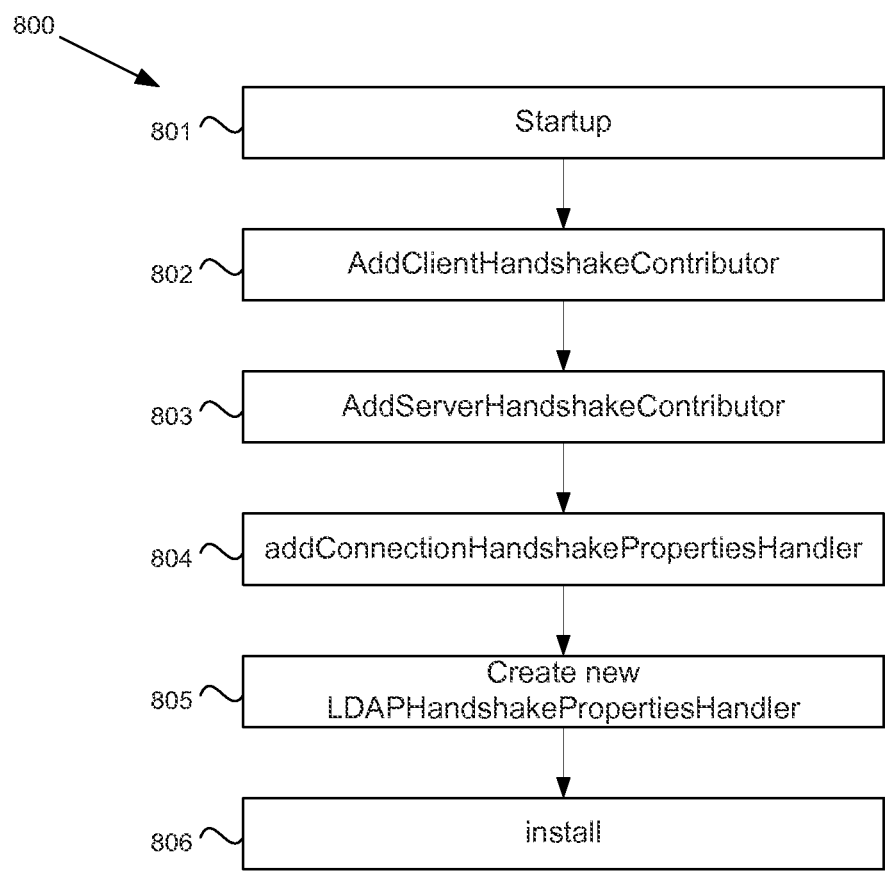
FIG. 14 depicts a process for adding contributors and handlers to a server.
Figure 15:
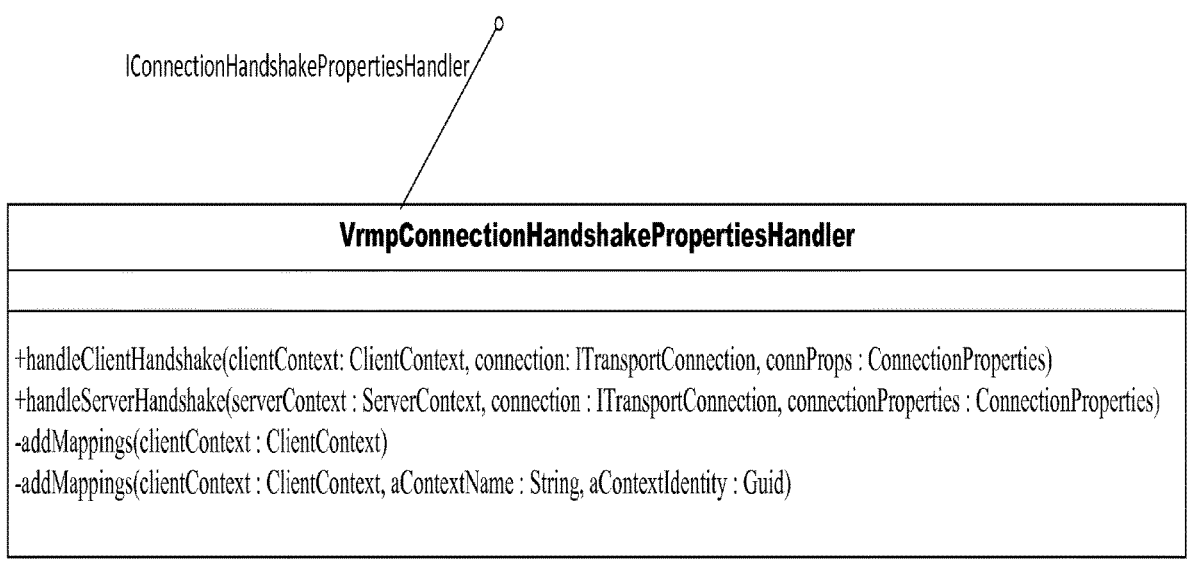
FIG. 15 depicts a class diagram for a proprietary ConnectionHandshakePropertiesHandler.

There are different ways to add handshakeContributors and handshakePropertiesHandler. An example of adding contributors and handlers in an application server is depicted in the flowchart 800 of FIG. 14. At step 801, the application server performs startup. Steps 802 to 804 are the initialization of MessagingProtocol. In the Voyager example, VrmpConnectionHandshakeContributor is added to the MessagingProtocol's addClientHandshakeContributor and addServerHandshakeContributor. In step 804 VrmpConnectionHandshakePropertiesHandler (see FIG. 15) is added to MessagingProtocol's addConnectionHandshakePropertiesHandler. The messaging protocol may then perform handshake based on the established set of contributors as described above. At some later time, the contributors are to be updated with an LDAP contributor and thus, at step 805 a new instance of LDAPHandshakePropertiesHandler is created. At step 806, an install procedure is invoked on the new instance. The install procedure adds LDAPHandshakePropertiesHandler into MessagingProtocol's addConnectionHandshakePropertiesHandler. The next time a server handshake is performed, it will utilize the updated LDAP contributor.

Figure 16:
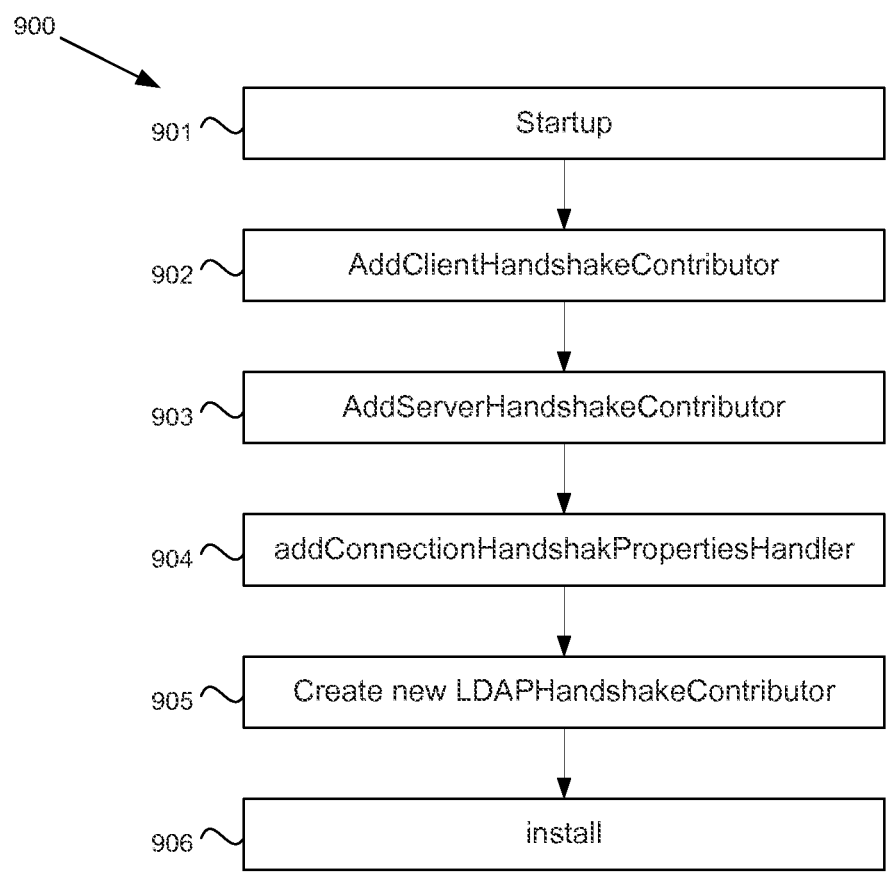
FIG. 16 depicts a process for adding contributors and handlers to a client.

The flow chart 900 of FIG. 16 depicts adding contributors and handlers in an application client. At step 901, the application client performs startup. Steps 902 to 904 are the initialization of MessagingProtocol. Here, VrmpConnectionHandshakeContributor is added to the MessagingProtocol's addClientHandshakeContributor and addServerHandshakeContributor. At step 904 VrmpConnectionHandshakePropertiesHandler is added to addConnectionHandshakePropertiesHandler. At step 905. a new instance of LDAPHandshakeContributor is created. At step 906, install is called on the new instance. What install does here is add LDAPHandshakeContributor into MessagingProtocol's addClientHandshakeContributor.

In summary, after new contributor and handler are created, the contributor and handler can be added by calling MessagingProtocol.addClientHandshakeContributor(contributor) or MessagingProtocol.addServerHandshakeContributor and MessagingProtocol.addConnectionHandshakePropertiesHandler any time before connection initialization stage.

As for the contributor list, in the sendHandshake process (FIG. 5), the outer loop will iterate through contributors. For the above example it will get VrmpConnectionHandshakeContributor as well as LDAPHandshakeContributor. So as long as contributors are added before the connection negotiation stage, all the properties related to each contributor will be sent out to the other side and application can handle the result accordingly.

An advantage of the "contributor" concept is that the handshake may be added dynamically without requiring changes to the underlying protocol. New contributors can be added at any time before connection by invoking the addClientHandshakeContributor, addServerHandshakeContributor and addContributorHandler. For instance, at one time the application may have it own connection handshake mechanism. Applying the contributor concept, there may be a generic ProtocolConnectionContributor, which holds the properties for a handshake between two devices. There may also be a ProtocolConnectionHandshakePropertiesHandler to handle the result of the handshake. Here the ProtocolConnectionHandshakePropertiesHandler is the class and has two methods, e.g. HandleServerHandshake and HandleClientHandshake. Later on the needs for authentication using LDAP may arise as a new requirement. The additional handshake requirement for LDAP can be grouped into LDAPHandshakeContributor and the handling for the LDAP handshake into LDAPHandshakePropertiesHandler. The LDAPHandshake may belong to a separate module with its own purpose such that it does not interfere with the existing ProtocolConnectionHandshake.

A further advantage includes that a client may send the publically visible IP and port as properties for a contributor. For instance, the client is residing behind a router or NAT. In addition, the GUID for a client may be sent to enable identity confirmation on reconnections.

A further advantage is the dynamic nature of the process. There is no restriction on how many contributors can be utilized. Handshake protocols therefore no longer need to follow fixed rules, thereby alleviating problems when demands for new rules come in.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:
1. A method, comprising:
installing, in a first device, a connection handshake properties handler for at least one first contributor defining one or more first connection handshake properties;

reading, by the connection handshake properties handler a unique name and a name/value pair defining the one or more first connection properties for the at least one first contributor;

performing a first handshake to a second device utilizing the read unique name and the name/value pair;

updating a contributor list with at least one second contributor defining one or more second connection handshake properties utilizing the connection handshake properties handler; and performing a second handshake utilizing the updated contributor list.

2. The method of claim 1, further comprising:
generating the connection handshake properties handler.

3. The method of claim 2, wherein generating the connection handshake properties handler further comprises:
generating a connection handshake properties handler with one or more client connection handshake properties.

4. The method of claim 2, wherein generating the connection handshake properties handler further comprises:
generating a connection handshake properties handler with one or more server connection handshake properties.

5. The method of claim 1, further comprising:
installing the connection handshake properties handler in the second device.

6. The method of claim 1, further comprising:
updating the connection handshake properties handler.

7. The method of claim 6, wherein the connection handshake properties handler is updated with the second connection properties.

8. The method of claim 1, wherein the performing the second handshake further comprises:
generating a handshake with one or more connection properties of the one or more contributors in the updated contributor list.

9. The method of claim 1, further comprising:
generating a plurality of contributors.

10. The method of claim 9, further comprising:
adding the plurality of contributors to the contributor list.

11. A non-transitory computer-readable medium comprising computer-executable instructions that when executed by at least one processor, cause the at least one processor to:
install, in a first device, a connection handshake properties handler for at least one first contributor defining one or more first connection handshake properties;
read, by the connection handshake properties handler a unique name and a name/value pair defining the one or more first connection properties for the at least one first contributor;
perform a first handshake to a second device utilizing the read unique name and the name/value pair;
update a contributor list with at least one second contributor defining one or more second connection handshake properties utilizing the connection handshake properties handler; and
perform a second handshake utilizing the updated contributor list.

12. The non-transitory computer-readable medium of claim 11, where the computer-executable instructions further cause the processor to:
generate the connection handshake properties handler.

13. The non-transitory computer-readable medium of claim 12, wherein the connection handshake properties handler being generated further comprises:
a connection handshake properties handler being generated with one or more client connection handshake properties.

14. The non-transitory computer-readable medium of claim 12, wherein the connection handshake properties handler being generated further comprises:
a connection handshake properties handler being generated with one or more server connection handshake properties.

15. The non-transitory computer-readable medium of claim 11, where the computer-executable instructions further cause the processor to:
install the connection handshake properties handler in the second device.

16. The non-transitory computer-readable medium of claim 11, where the computer-executable instructions further cause the processor to:
update the connection handshake properties handler.

17. The non-transitory computer-readable medium of claim 16, wherein the connection handshake properties handler is updated with the second connection properties.

18. The non-transitory computer-readable medium of claim 11, wherein the second handshake being performed further comprises:
a handshake being generated with one or more connection properties of the one or more contributors in the updated contributor list.

19. The non-transitory computer-readable medium of claim 11, where the computer-executable instructions further cause the processor to:
generate a plurality of contributors.

20. The non-transitory computer-readable medium of claim 11, where the computer-executable instructions further cause the processor to:
add the plurality of contributors to the contributor list.

* * * * *